July 28, 1936.    A. N. MUNN    2,048,943
CHECK VALVE
Filed April 21, 1934
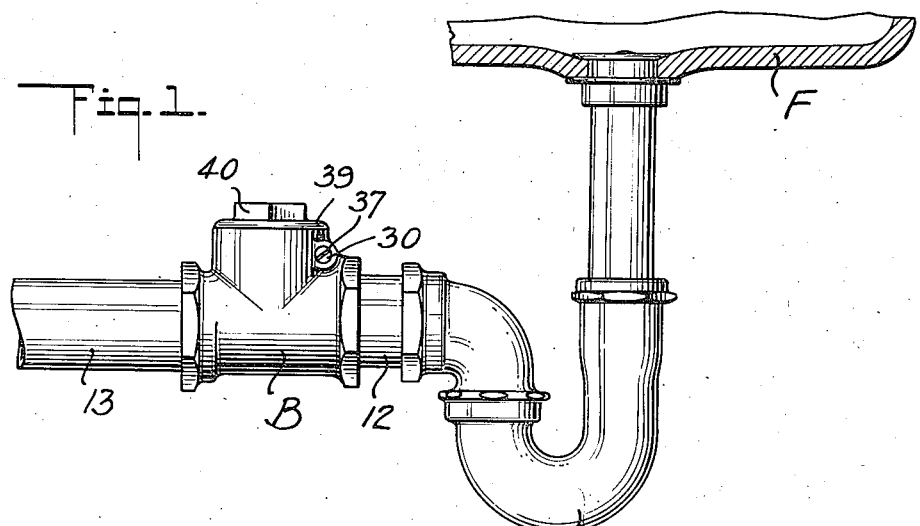
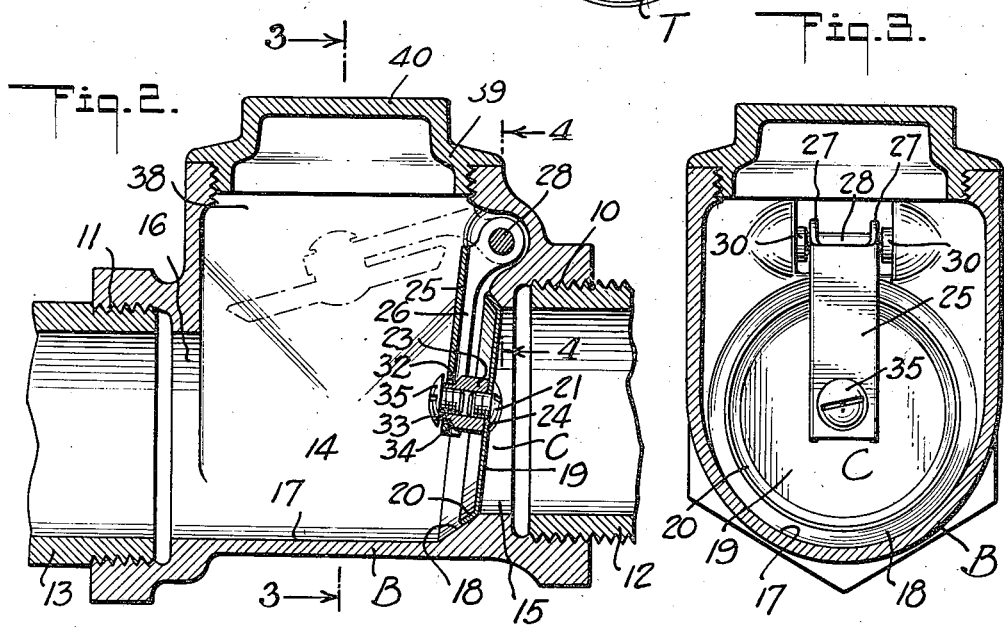
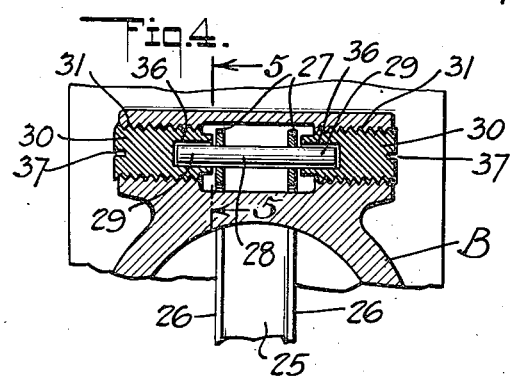
INVENTOR.
ALFRED N. MUNN
BY
Munn, Anderson & Liddy
ATTORNEYS.

Patented July 28, 1936

2,048,943

UNITED STATES PATENT OFFICE 2,048,943

CHECK VALVE

Alfred N. Munn, Huntington Park, Calif.

Application April 21, 1934, Serial No. 721,807

1 Claim. (Cl. 251—123)

This invention relates generally to valves, and more particularly to check valves for preventing the flow of fluid in one direction in a flow line.

An object of the invention is to provide a novel check valve primarily intended, although not necessarily, for installation in a drain pipe at the sewer side of a water sealed trap of a sink, wash basin, tub or other plumbing fixture, and which is automatically operable to positively and completely prevent overflowing of the fixture in the event that the drain pipe becomes clogged, and to prevent sewer gas under pressure from entering the fixture and then the building by breaking the water seal of the trap.

Another important object of this invention is to provide a novel check valve structurally characterized in a manner to be extremely sensitive so as to respond to any slight back pressure in the flow line by positively preventing the backing up of soap froth into the fixture, generated in the drain pipe from the action of washing compounds discharged into the pipe and attacking accumulated grease on the wall of the pipe, all while affording the desirable qualities of structural simplicity and ruggedness as well as comparative inexpensiveness of manufacture.

Another object of the invention is to provide a novel check valve which when opened under the action of water discharging from the fixtures permits the maximum possible flow of water and presents smooth and continuous internal surfaces so as to prevent foreign substances, such as match sticks, for example, from becoming jammed in the flow line and possibly obstructing the latter.

With these and other objects in view, the invention consists in the novel construction and arrangement and functioning of parts as hereinafter described and claimed.

In the accompanying drawing,

Figure 1 is a view in side elevation showing the check valve installed in the drain pipe of a plumbing fixture;

Figure 2 is an enlarged vertical axial sectional view of the check valve;

Figure 3 is a vertical transverse sectional view taken on the line 3—3 of Figure 2;

Figure 4 is a fragmentary vertical sectional view taken on the line 4—4 of Figure 2;

Figure 5 is a detail sectional view taken on the line 5—5 of Figure 4.

In its present embodiment, the check valve comprises an open-ended cast metallic body B internally threaded at opposite ends as indicated at 10 and 11 to permit sections 12 and 13 of a drain pipe to be screwed thereinto so that the body constitutes a part of the drain pipe at the sewer side of a conventional water-sealed trap T of a plumbing fixture F, as is shown in Figure 1.

The body is provided with a cylindrical chamber 14 having an inlet 15 registering with the pipe section 12 from the trap T, and an outlet 16 registering with the pipe section 13. The intervening longitudinal bore 17 of the body smoothly connects the outlet 16 with a beveled annular seat 18 surrounding the inlet 15 which latter is controlled by a closure member C cooperable with the seat. The longitudinal bore through the body is thus free from any cavities, recesses or projections of such nature as might cause foreign substances, such as matchsticks, to become jammed in the body and thus obstruct the free flow of water through the body.

The closure member C comprises a sheet metal disk 19, the periphery of which is formed to provide a flared or beveled flange 20 of an angle and diameter to accurately fit the beveled annular seat 18 and produce a water-tight seal between the disk and seat. The disk is provided with an axial opening through which the shank of a headed screw 21 is passed and is tightly screwed into the threaded bore 22 of a sleeve 23 so as to draw one end face 24 of the sleeve firmly against the disk and thereby rigidly secure the sleeve to the disk with the joints between the disk, screw and sleeve sealed water-tight. The sleeve thus forms a lateral boss or hub at the axis of the disk.

The disk is mounted in the chamber 14 to occupy the open and closed positions relative to the seat 18 as respectively indicated in broken and full lines in Figure 2. For this purpose a sheet metal arm 25 of channel shape in cross section has its side flanges 26 terminating at one end of the arm in ears 27 provided with registering apertures through which is passed a pivot pin 28, the end portions of which provide journals 29—29 mounted in bearings 30—30.

These bearings are in the form of externally threaded bodies which are screwed into alined and threaded bores 31—31 formed in the body B, the common axis of the bearings being transversely arranged with respect to the axis of the disk 19.

Adjacent its free end the arm 25 is provided with an opening 32 freely receiving the reduced cylindrical end portion 33 of the sleeve 23. Between the reduced portion 33 and the main body of the sleeve is a rounded or beveled shoulder 34; and threaded into the bore of the sleeve is the shank of a headed screw 35, the head of which abuts the end face of the reduced portion 33. As the reduced portion 33 is free in the opening 32 of the arm 25, and as the length of the reduced portion is in excess of the thickness of the arm, the disk will be loosely connected to the arm to form what in effect is a universal joint between the two permitting a limited tilting movement of the disk relative to the arm, so that the disk can adjust itself to the seat 18 and thus have a firm bearing on the latter to insure a watertight seal between the disk and seat. It will be clear that the shoulder 34 is rounded or beveled in order not to obstruct such tilting adjustment of the disk relative to the arm and thus to the axis of the seat.

It will be noted from a consideration of Figures 4 and 5 that the bores 36—36 of the bearings 39—39 receiving the journals 29—29 of the pivot pin 26 are drilled slightly eccentric with respect to the axes of the bearings, and that the outer ends of the latter are provided with kerfs 37 to enable the bearings to be installed and readily adjusted. The provision of the eccentric bores 36—36 permits radial adjustment of the arm 25 and closure member C relative to the seat 18 to be effected to properly center the member, as it will be appreciated that by rotatably adjusting one bearing or the other or both, that angular adjustments as well as lateral adjustments of the pin bodily towards and away from the axis of the seat can be obtained. It will be understood that in order to permit angular adjustments of the pin, the journals of the pin have a slight clearance fit in the bores 36—36 of the bearings.

The plane of the angular seat 18 is disposed at an angle slightly different from a right angular relationship with the longitudinal axis of the body B so that with the latter supported in substantially the horizontal position shown in the drawing, the closure member will tend to gravitate to closed position. The body B is provided with a lateral opening 38 communicating with the chamber through which access can be had to the closure member and its mounting means for assembling, inspection and repair purposes. This opening is normally closed by a screw plug 39 having a wrench-receiving head 40.

In the operation of the valve, it will be clear that with the valve installed so that the closure member will be opened by water discharging from the trap T the water will sustain the member entirely clear of the flow line in the open position shown in broken lines in Figure 2 and will pass freely through the body as no obstructions are present which will impede the flow and cause foreign substances to collect in the body.

When the flow ceases, the valve will immediately gravitate to its closed position shown in full lines in Figure 2, so that any back pressure, regardless of how slight such pressure may be, will act upon the disk 19 to force the latter into sealing engagement with its seat 18, so as to prevent both liquids and gases from entering the trap T and breaking the water seal therein. The manner in which the valve is mounted insures that soap froth or bubbles generated in the drain pipe by the action of soap powder on accumulated grease will force the valve into sealing engagement with its seat so that such extremely light matter cannot leak by the valve.

It will be appreciated that the internal wall 17 of the body which forms a continuation of the flaring or beveled seat 18 offers no obstruction which would tend to stop the passage of a match stick or hairpin in the body at a point for a portion of such a foreign body to overlie the seat and prevent seating of the disk 19 with the consequent failure of the valve to function as intended. This construction constitutes a highly important feature of my invention, as it insures that the seat 18 will remain clear of any foreign matter for sealing engagement of the disk 19 therewith.

What is claimed is:

In a check valve having a hollow body, and an arm pivotally supported by the body adjacent to an inlet orifice, said arm having an opening, a closure disc for said orifice, and means providing a universal connection between the arm and said disc, said connection comprising a hollow sleeve provided with a threaded bore, the sleeve having one end engaged with one face of the disc and being fixedly confined thereto by a screw passing through the disc and into the adjacent end of said threaded bore, the opposite end of the sleeve being of a reduced diameter as compared with the remaining portion of the sleeve and of less diameter than the diameter of the opening in said arm, whereby to enable the disc to tilt relative to the arm, said reduced portion of the sleeve being of a length to extend beyond one side of the arm, and a screw passing into the opposite end of the bore for maintaining operative association of the sleeve with said arm.

ALFRED N. MUNN.